(12) United States Patent
Lee (10) Patent No.: US 10,953,312 B1
(45) Date of Patent: Mar. 23, 2021

(54) VIRTUAL GAME CONSOLE USING MULTIPLE NFC DEVICES SIMULTANEOUSLY

(71) Applicant: Blok Party, Inc., South San Francisco, CA (US)

(72) Inventor: Kwok Shing Lee, San Mateo, CA (US)

(73) Assignee: Blok Party, Inc., South San Francisco, CA (US)

( * ) Notice: Subject to any disclaimer, the term of this patent is extended or adjusted under 35 U.S.C. 154(b) by 0 days.

(21) Appl. No.: 16/920,367

(22) Filed: Jul. 2, 2020

(51) Int. Cl.
  *A63F 3/00* (2006.01)
  *A63F 9/24* (2006.01)
  *H04L 9/06* (2006.01)

(52) U.S. Cl.
  CPC ............ *A63F 3/00028* (2013.01); *A63F 9/24* (2013.01); *H04L 9/0637* (2013.01); *A63F 2003/00662* (2013.01); *A63F 2009/241* (2013.01); *A63F 2009/243* (2013.01)

(58) Field of Classification Search
  CPC ...... G02F 1/13338; H01Q 7/00; H01Q 1/243; H01Q 1/44; G06F 2203/04108; G06F 3/0416; G06Q 20/3278; H04B 5/00
  See application file for complete search history.

(56) References Cited

U.S. PATENT DOCUMENTS

| | | | |
|---|---|---|---|
| 8,217,913 B2* | 7/2012 | Hotelling | G06F 3/0412 345/173 |
| 9,178,572 B1* | 11/2015 | Zhang | H04B 5/0012 |
| 2015/0118958 A1* | 4/2015 | Jain | G06Q 20/353 455/41.1 |
| 2017/0124364 A1* | 5/2017 | Villar | G06K 7/10376 |
| 2017/0154328 A1* | 6/2017 | Zarakas | G06Q 20/204 |
| 2019/0348209 A1* | 11/2019 | Wen | H01F 41/122 |

* cited by examiner

*Primary Examiner* — Mirza F Alam
(74) *Attorney, Agent, or Firm* — Cognition IP, P.C.; Edward Steakley (57) ABSTRACT

Disclosed embodiments relate to computing devices simultaneously pairing with multiple near-field communication (NFC) devices. In one example, a system includes a processor and a touchscreen having a top layer logically partitioned into N zones overlaying a three-dimensional antenna having multiple layers together including at least N NFC antennae, and wherein the processor is configured to: map each of the N zones to one or more closest NFC antennae, display a user interface on the top layer, and when each of two or more NFC devices touches a respective touchscreen zone, select an NFC antenna to establish a peer-to-peer connection with the NFC device, read NFC tag data from the NFC device, and pass the NFC tag data to the application.

22 Claims, 11 Drawing Sheets

VIRTUAL GAME CONSOLE USING MULTIPLE NFC DEVICES SIMULTANEOUSLY

TECHNICAL FIELD

Aspects of the disclosure relate to the field of near-field communication (NFC) and, more particularly, to computing devices and methods of simultaneously using multiple NFC objects with an application. Exemplary embodiments describe a virtual game console, a virtual security device, a virtual cash register, and a virtual checkout stand, all using multiple NFC devices simultaneously.

BACKGROUND

Tabletop board games offer opportunities for friends and family to bond, share, and connect while playing games together. In contrast to console video gaming systems that focus on a television screen, Tabletop games allow friends and family to meet elbow-to-elbow, huddled around a common focus point. Indeed, myriad tabletop games exist, both in the past and the present, that can be enjoyed together and offer opportunities to connect.

Additional benefits can be derived from games that involve valuable, collectible game pieces. For example, Dungeons & Dragons Amiibo, and Magic the Gathering are gaming system for which valuable statues, figurines, and similar game items can be collected and traded. Several trading card games also offer collectible game cards that can make for stronger play and offer a point of pride and discussion among players.

Unfortunately, storing and maintaining such games and collectible game pieces, not to mention lugging them from place to place, is a challenge.

SUMMARY

One or more embodiments described herein, among other benefits, solve one or more of the foregoing problems by enabling computing devices simultaneously pairing with multiple near-field communication (NFC) devices. In one example, a system includes a processor and a touchscreen having a top layer logically partitioned into N zones overlaying a three-dimensional (3D) antenna having multiple NFC antenna layers together including N NFC antennae, and wherein the processor is configured to: map each of the N zones to one or more closest NFC antennae of the N NFC antennae, display a user interface on the top layer, and when each of two or more NFC devices touches a respective zone of the touchscreen, select an NFC antenna to establish a peer-to-peer connection with the NFC device (sometimes referred to herein as an NFC tag), In operation, the computing device is to read NFC tag data from the NFC device (NFC tag), and pass the NFC tag data to the application, for example a game. Among the advantages of the disclosed computing device is the ability to virtualize hundreds of games and allow them to be played with NFC game pieces. The costs and effort involved in storing, maintaining, and transporting games can be greatly reduced.

Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the drawings. Understanding that these drawings depict only typical examples and are not therefore to be considered to limit its scope, implementations will be described and explained with additional specificity and detail through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computing device, which includes a processor, a memory, and a non-transitory computer-readable medium. The memory and non-transitory medium may store instructions for performing methods and steps described herein.

As mentioned above, storing, maintaining, and transporting a wide collection of games, including board games is a challenge. Equally difficult is storing, maintaining, and transporting collectible game pieces to show to friends and to use with the games.

Embodiments of the invention, as described and disclosed herein, offer solutions to these problems. Described is a virtual gaming device (a.k.a., virtual game console, computing device), equipped with a processor, a touchscreen, and N near-field communication (NFC) antennae, which together allow simultaneous use of up to N NFC devices (NFC tags).

Figure 8:
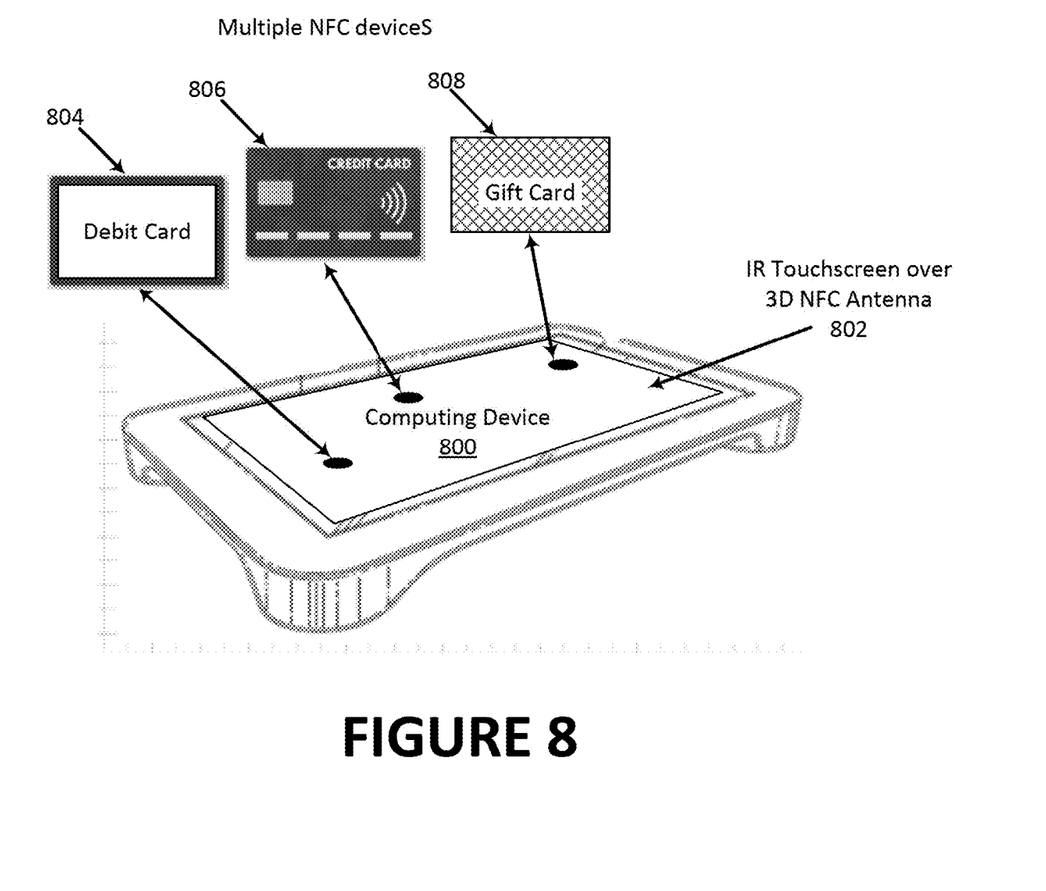
FIG. 8 illustrates a virtual checkout stand device using multiple NFC payment devices.
Figure 9:
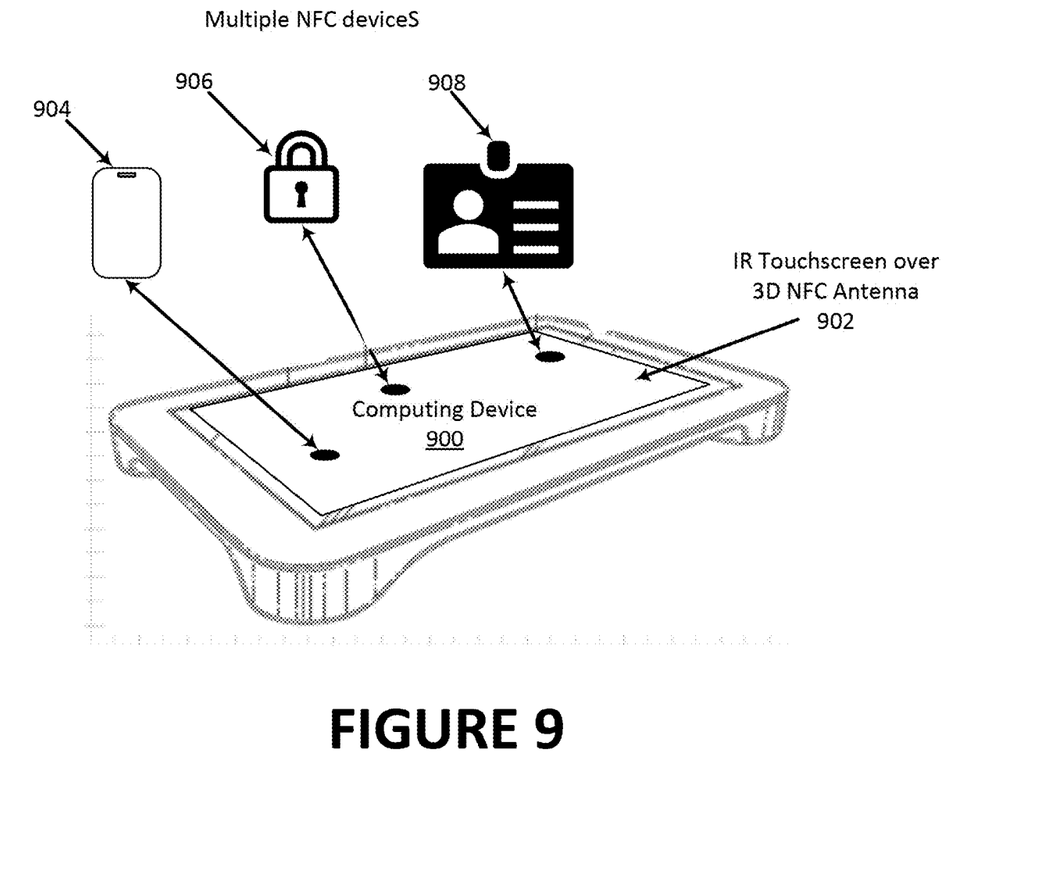
FIG. 9 illustrates a virtual security device using multiple NFC security devices.

Alternate means of addressing the abovementioned shortcomings have been attempted, but do not achieve the benefits of disclosed embodiments. For example, attempt have been made to ease storage and transportation of claims, but by having only one or just a few NFC antennae would not allow an advantage of allowing simultaneous use of up to N NFC devices (NFC tags). Inability to simultaneously use up to N NFC devices (NFC tags) would frustrate the ability to perform a multiple NFC-device transaction as illustrated in FIG. 8, to perform a multi-factor authentication as illustrated in FIG. 9, or to perform games and entertainment as illustrated and described with respect to FIG. 10.

The touchscreen of disclosed embodiments is logically partitioned into N zones, and overlays a stacked, 3-dimensional NFC antenna having at least N NFC antennae. In operation, the processor displays a user interface for an application on the touchscreen, and, when each of up to N NFC devices (NFC tags) touches a zone of the touchscreen, selects a nearby NFC antenna to establish a peer-to-peer connection with the NFC device, reads NFC tag data from the NFC device (NFC tag), and passes the NFC tag data and a unique identifier (UID) of the NFC device to the application.

The Computing Device

The computing device claimed and described herein can take on many different hardware forms, as long as it includes a touchscreen and a processor and is able to pair with up to N NFC devices (NFC tags). In some embodiments, the computing device is a virtual gaming device (a.k.a., virtual game console), such as computing device 100 illustrated in FIG. 1 and FIGS. 8-10. In some embodiments, the computing device is a tablet computer loaded with instructions stored on a non-transitory computer-readable medium, the instructions causing the tablet computer to perform methods as described herein, for example the methods illustrated and described with respect to FIG. 5.

In some embodiments, for example as illustrated in FIG. 8, the computing device can be used in a payment processing transactional application (virtual checkout stand), and pair with NFC-enabled payment cards.

In some embodiments, the computing device is used in a security or transaction-processing application and is used to pair with multiple NFC security devices or security cards, for example, as illustrated with respect to FIG. 9. Similarly, the computing device can be used to pair with multiple NFC-enabled name badges.

Selecting the NFC Antenna

In one of the method steps described and claimed herein, the processor is to select an NFC antenna to pair with each of the up to N NFC devices (NFC tags) that touch the touchscreen. In so doing, the processor only considers those NFC antenna not already paired with an NFC device. In some such embodiments, the processor selects a single, nearby NFC antenna. In other embodiments, the processor selects an NFC antennae directly below the touchscreen zone touched by the 3D device. In yet other embodiments, the processor conducts measurements using a number of candidate NFC antennae, then selects the antenna that exhibited the highest quality reading, for example in terms of signal strength, voltage level, noise level, and/or jitter. The number of candidate antenna can be 1, 2, 3, 4, and so on.

Near-Field Communication Modes

As is known, Near-Field Communication (NFC) works by exploiting the properties of electromagnetic fields, using the inductive coupling between NFC devices (NFC tags). Today, there are believed to be over two billion NFC-enabled devices in existence, including smartphones, tablet computers, smartwatches, and game controllers.

Figure 6:
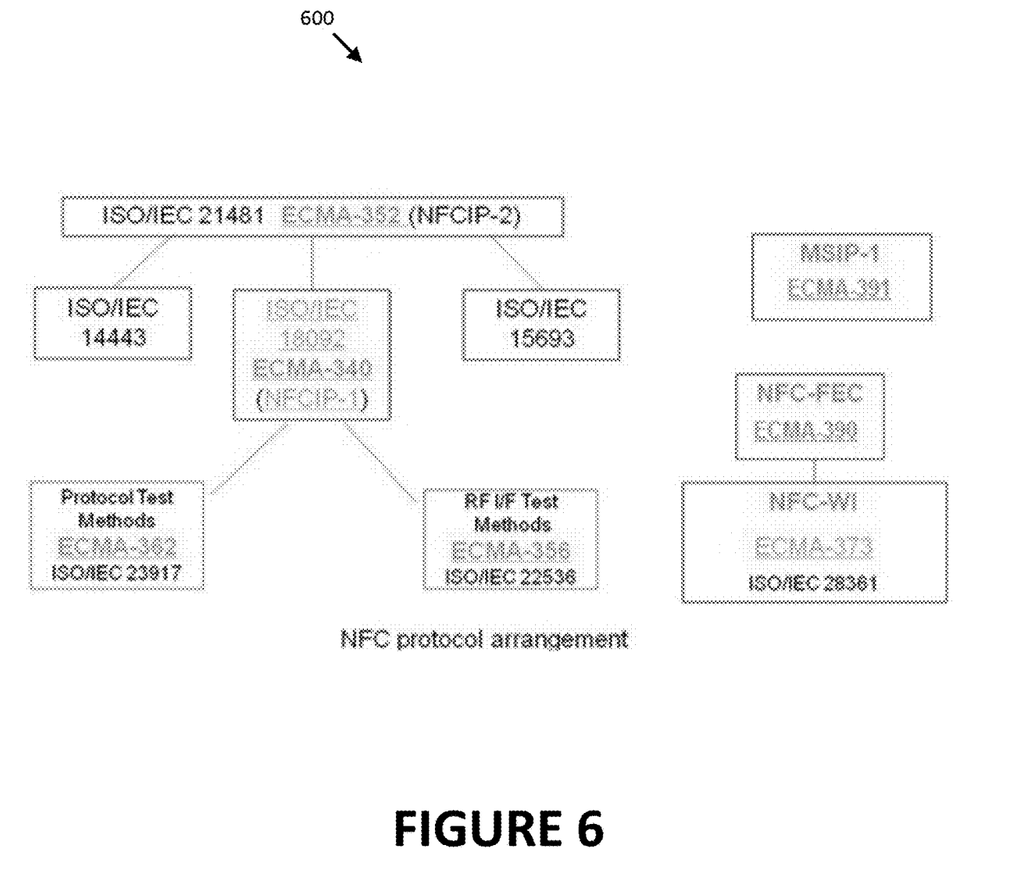
FIG. 6 depicts a protocol stack of near-field communications (NFC) standards.

In some embodiments, NFC antennae disposed underneath the touchscreen simultaneously pair with multiple NFC devices (NFC tags) in accordance with one or more international standards, some of which are illustrated and described in the protocol tree of FIG. 6. In operation, NFC antennae establish connections with NFC devices (NFC tags) in one of three different modes, which are reader/writer mode, peer-to-peer mode, and card emulation mode. NFC allows two-way interactions between NFC antennae and NFC devices (NFC tags).

Disclosed embodiments use an NFC-enabled computing device (a.k.a., virtual gaming device, virtual game console, virtual security device, or virtual checkout stand) simultaneously pair with multiple NFC devices (NFC tags). As used herein, NFC devices are sometimes referred to as NFC objects, or NFC tags. Today, NFC tags are known to come in five types. Some NFC tags of different types are fully programmable. In other words, the processor of the disclosed computing device can be further configured to cause write data to be written to an NFC device (NFC tag) from an NFC antenna. For example, the write data can consist of log data to log a use of the NFC device (NFC tag), ownership information, game piece characteristics (available functions, special moves, appearance, etc.), payment information, security information, identity information, and Blockchain data to add the NFC device to a Blockchain. Use of NFC tags is further described with respect to their use as game pieces in exemplary gaming applications such as those listed in Tables 1, 2, and 3.

NFC devices (NFC tags) bear a unique identifier (UID) that identifies a manufacturer and a serial number. The processor of disclosed embodiments reads the UID, a format for which is further described and illustrated in FIG. 7.

The Touchscreen

The touchscreen used in disclosed and claimed embodiments can use any of several touchscreen technologies, including resistive, capacitive, and infrared (IR) technologies.

Resistive touchscreens are relatively basic and common touch screens and can be used in cost-sensitive embodiments. Resistive touchscreens work by having two electrically conductive layers bend to touch one another. Resistive touch screens are durable and consistent but can be harder to read and can only handle one touch at a time, ruling out, for example, a two-finger zoom.

Capacitive touchscreens, in contrast, do not use the pressure of a finger to create a change in the flow of electricity. Instead, they work with anything that holds an electrical charge—including human skin. Capacitive touch screens sometimes use patterned glass to achieve desired capacitive conditions.

IR touchscreens identify touch by detecting interruptions in a uniform beam of light. In some embodiments, IR touchscreens have a grid-like array of LED lights and photodetectors (sensors) around the edges of the device. These LEDs constantly emit and project light. When the IR touchscreen surface is touched, it creates a disturbance in this light. The device can then determine where this disturbance occurred to identify the precise point of contact. For their part, IR touchscreens share some advantages of both resistive and capacitive touchscreens. An IR touchscreen can provide better durability than a comparably-sized capacitive touchscreen, at least insofar as it does not require patterned or similarly brittle glass, and better sensitivity than a comparably-sized resistive touchscreen at least insofar as it does not require as much force or as consistent an amount of force in a touch.

The Application

As described above, disclosed embodiments enable simultaneously using multiple NFC devices (tags) during execution of an application. FIG. 5 illustrates a method of executing an application with a computing device illustrated and described herein, for example in FIGS. 1, 2, 3, and 4.

In some embodiments, the application is used in a payment processing or transactional context, for example to simultaneously connect with multiple NFC-enabled payment devices, such as debit cards, credit cards, or gift cards, as illustrated and described with respect to FIG. 8. In such embodiments, the computing device is sometimes referred to herein as a virtual cash register or virtual check-out stand.

In some embodiments, the application is used in a security context, for example as a multi-factor authentication application running on a computing device paired with 2 or more identifying items, like security cards, identification cards, or identity badges, as illustrated and described with respect to FIG. 9. In such embodiments, the computing device is sometimes referred to herein as a virtual security device.

In some embodiments, the application is a multi-player gaming application. For example, Table 1 lists a few examples of well-known board games or table-top games that can be performed virtually by the disclosed computing device (a.k.a. virtual gaming device or virtual game console). The rules of operation of each of these games are understood, and not repeated here. But for each game, Table 1 lists the types and numbers of NFC devices (NFC tags) that can be used. For example, a disclosed computing device can use 32 NFC antennae to pair with each of 32 game pieces to execute the chess application. In such a scenario, each of the NFC devices (NFC tags) can contain NFC data that lists the name of the piece, such as king, queen, rook, bishop, knight, and pawn. The NFC data can further include the allowed moves of the game piece. For example, for a king piece, the NFC data can indicate it is allowed to move one spot in any direction. The NFC data can further include a current game state, a history of past moves, available functions, customizing characteristics, etc. In some embodiments, the virtual game console is associated with a set of game pieces sufficient to execute a multiplayer game from start to finish.

Create your own game: In some embodiments, the disclosed computing system provides a user interface to allow a custom board game to be created. For example, such a user interface can be used to define a game that runs on an 8×8 board. Such a game can be set to work for two plyers, reach controlling 1 custom-king game piece and 15 custom-queen game pieces. Programming would proceed by providing 32 programmable, e.g., Type 2, NFC tags, and establishing writeable connections between the NFC tags and 32 NFC antennae. Each of the custom-king NFC tags would be programmed to be able to move one square in any direction, so long as that square is not occupied by an enemy piece. The custom-king would also be able attack any enemy piece disposed one square away in any direction. Each of the custom-queen NFC tags would be programmed to be able to move diagonally, horizontally, or vertically any number of squares, without the ability to jump over pieces. Game play would proceed by each player lining up 16 NFG tag game pieces along two rows, and the processor would use NFC antenna to write positions into each of the 32 NFC tags. The processor would then conduct the game with the user interface to allow two players to take turns, each turn deciding whether to move a game piece in a selected direction or attack an enemy game piece. In some embodiments, such user intentions can be communicated to the processor by allowing a player to pick up a game piece and place it in a new square.

Supplemental User Interface: in some embodiments, the computing system establishes a wireless connection, such as Bluetooth, Wi-Fi, or NFC, with a mobile device held by each player. Each handheld mobile device in such embodiments displays a user interface, which can be related to, but not necessarily identical to the user interface on computing device 100 (virtual game console). In such embodiment, the processor of the computing device accepts control inputs from the mobile devices.

TABLE 1

Table-top Gaines and Boardgames

| Game | Description | Pieces |
| --- | --- | --- |
| Chess | 16 pieces per side | 32 |
| Catan | Chits, cities, dice, etc. | 65+ |
| Checkers | 12 pieces per side | 24 |
| Strategy | 40 pieces per side | 80 |
| ThickFun | 18-piece math dice game | 18 |
| Ticket to Ride | Trains, Locomotives, Destinations | 100+ |

In some embodiments, the application is directed to fantasy sports or athletic competitions. For example, Table 2 lists just a few examples of well-known fantasy sports and athletics games that can be performed virtually by the disclosed computing device. The rules of operation of each of these games are understood, and not repeated here. But for each game, Table 2 lists the types and numbers of NFC devices (NFC tags) that can be used. For example, a disclosed computing device can execute a four-player fantasy football game using 64 NFC antennae to pair with each of 64 NFC devices (NFC tags) carrying information for 64 game pieces that support 16 slots on each of four fantasy football rosters.

In one example, a group of four or more friends and family can gather around a computing device (a.k.a., virtual gaming device or virtual gaming console) as disclosed to engage in a fantasy baseball game using player information stored on 84 or more NFC devices (NFC tags), with 21 spots for each roster. In this example, the computing device includes a touchscreen having a top layer logically partitioned into at least 84 zones, and overlaying a multi-layer, 3D antenna having at least 84 antennae. To execute the game, the computing device can display a user interface, such as a fantasy baseball page having 21 slots for each of four teams, and map each of the 84 logical zones to one of the 84 NFC devices (tags). When each of the 84 NFC devices (tags) touches a respective zone of the touchscreen, the virtual game console selects an NFC antenna to establish a peer-to-peer connection with the NFC device (tag), reads NFC tag data and UID from the NFC device, and passes the NFC tag data to the fantasy baseball application. As the game progresses, each of the NFC tags can be updated to reflect the latest statistics for the corresponding player.

Conduct a live, in-person draft: To exemplify a further advantage, the disclosed computing device (virtual gaming device or virtual game console) can be used to enable a group of fantasy baseball players to conduct a live draft and initialize their NFC devices (tags). To do so, a set of up to 50 blank, programmable NFC tags is provided for each player. (At today's prices, a pack of 50 programmable Type 2 NFC tags can be purchased for about the price of a pizza). The user interface of the virtual game console can display details about a player currently being auctioned. The players would use the computing device to conduct a draft, committing information about each drafted player to an NFC tag. Such information is written to the NFC tag through an NFC antenna.

Updating NFC Data: Once a peer-to-peer connection has been established between the NFC antenna and the NFC tag, the NFC tag data can be updated to update player statistics as the game progresses. In the case of fantasy baseball, such statistics include batting average, home runs, runs, runs batted in, etc.

Not enough NFC antennae and NFC tags? when an application requires more NFC tags than can be supported by the computing device one or more of several approaches are conducted. In one approach, the application can be modified to make do with less than the total number of NFC tags, for example 7-on-7 football rather than 11-on-11. In a second approach, the application is modified to only consider starting players on each roster; those players "on the bench" are not allotted an NFC tag.

In another approach the computing device reads the NFC tags multiple times, storing NFC data in some local memory. The process is repeated as many times as necessary, reading M tags each time until N NFC tags are read.

In yet another approach, some of the N NFC tags are assigned a default, automatic behavior. In general, the computing device can also apply artificial intelligence to automate the gameplay of one or more players or game pieces.

TABLE 2

Fantasy Sports and Athletic Games

| Game | Roster Positions | Spots |
|---|---|---|
| Fantasy Baseball | 16 starters, 5 bench | 21 |
| Fantasy Basketball | 5 starters, 8 bench | 13 |
| Fantasy Football | 9 starters, 7 bench | 16 |
| Fantasy Hockey | 6 starters 14 bench | 20 |
| Summer Sports | 15 track & field events | 15 |

In yet other embodiments, the application is a collectible figurine or trading card game. For example, Table 3 lists just a few examples of well-known collectible figurine and trading card games that can be performed using the disclosed computing device. The rules of operation of each of these games are understood, so are not repeated here. But for each game, Table 3 lists the types of NFC devices (NFC tags) that can be used. In each case, the number of figurines and cards desired may be unlimited, but the number actually used depends on the number of available NFC antennae and NFC tags.

Figure 1:
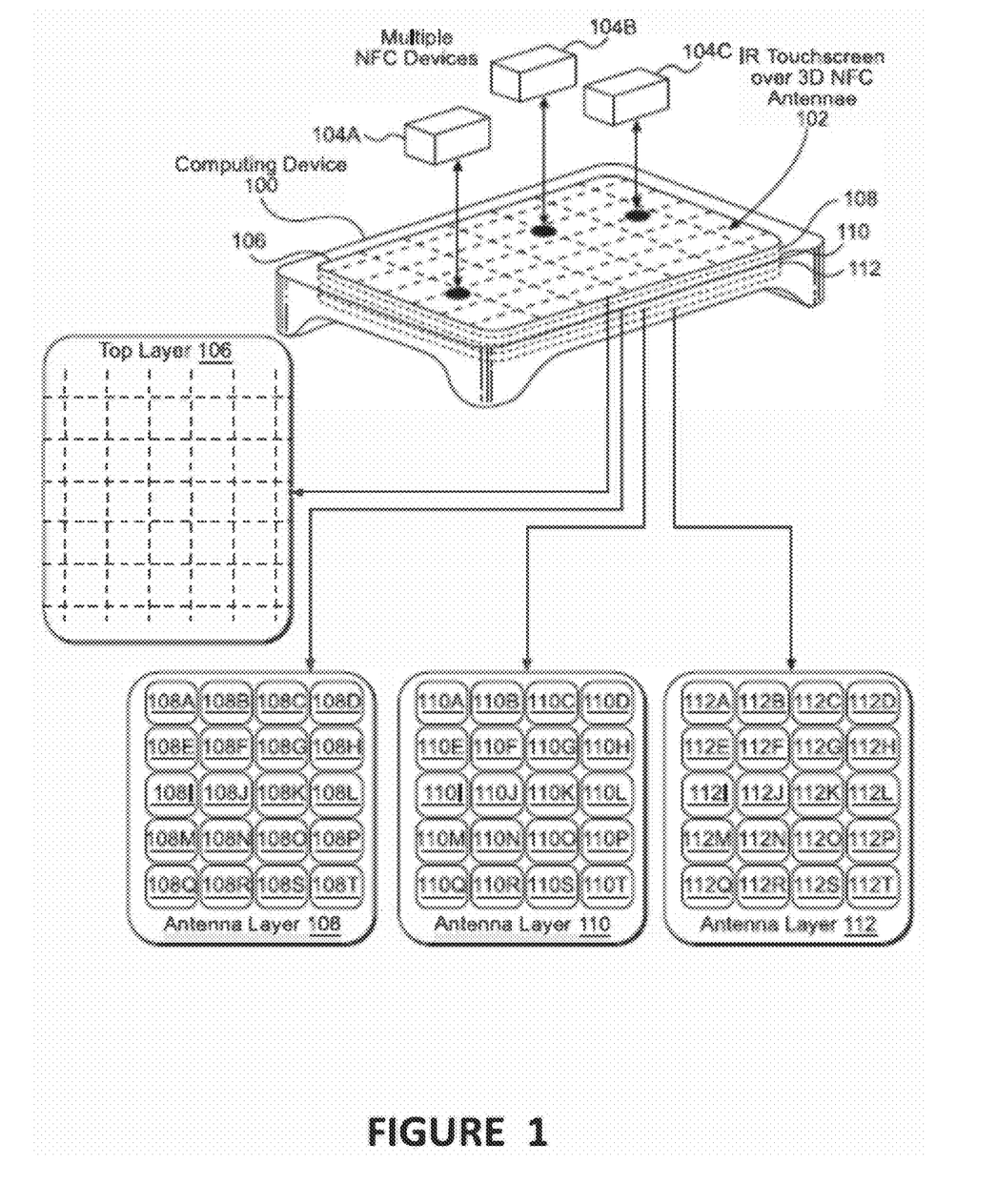
FIG. 1 depicts a computing device connecting with multiple NFC devices, according to some embodiments.

In operation, a computing device such as computing device 100 of FIG. 1 is used. For any of the games listed in Table 3, the processor is configured to map each of the N logically partitioned zones of the touchscreen to one or more closest antennae of the N NFC antennae. The processor is further configured to display a user interface on the top layer, and when each of two or more NFC devices (NFC tags) touches a zone of the touchscreen, select an NFC antenna to establish a peer-to-peer connection with the NFC device, read NFC tag data and a unique identifier (UID) from the NFC device, and pass the NFC tag data and UID to the application. In the case of Dungeons & Dragons, for example, the NFC tag data can include information, such as special abilities, magic items, inventory, hit points, etc.

Build your party, live and in-person: To exemplify a further advantage, the disclosed computing device (virtual gaming device or virtual game console) can be used to enable multiple players engaging in a Dungeons & Dragons game to initialize the character details stored on each of their player NFC devices (tags). To do so, a set of up to 50 blank, programmable NFC tags is provided for each player. The user interface of the virtual game console can display details about a character currently being generated. The players would use the computing device to write player characteristics to an NFC tag through an NFC antenna.

Block Chain: In any of the games listed in Table 3, as well as any games where the game pieces include valuable, collectible items, the items are organized into a Blockchain, serving as a ledger to securely maintain the game pieces as digital assets. The use of Blockchain technology is further illustrated and described with respect to FIG. 11.

TABLE 3

Collectible Figurine and Card Games

| Game | Game Piece Descriptions |
|---|---|
| Dungeons & Dragons | Players, Monsters |
| Pokemon | Pokemon characters |
| Jyhad (Vampire) | Collectible vampire cards |
| Magic the Gathering | Collectible card strategy game |
| Amiibo | Collectible card game |

The Figures

FIG. 1 depicts an embodiment of a device and near-field communication (NFC) devices. As shown, computing device 100 includes a processor (not shown) to execute an application using information stored on near-field communication (NFC) devices 104A, 104B, and 104C. Computer system 100 includes an infrared (IR) touchscreen having a top layer 106 logically partitioned into N zones, with N equaling 60. Beneath the top layer 106 is a three-dimensional (3D) antenna that includes three NFC antenna layers 108 (containing NFC antennae 108A-108P), 110 (containing NFC antennae 110A-110P), and 112 (containing NFC antennae 112A-112P), which together contain 60 NFC. The total number of NFC antennae need not equal the number of logical partitions of the top layer.

In operation, the processor is configured to map each of the N zones to one or more closest antennae of the N NFC antennae, display a user interface on the top layer, and, when each of the NFC devices 104A, 104B, and 104C, touches a respective zone of the touchscreen, select an NFC antenna to establish a peer-to-peer connection with the NFC device, read NFC tag data from the NFC device, and pass the NFC tag data to the application.

Figure 2:
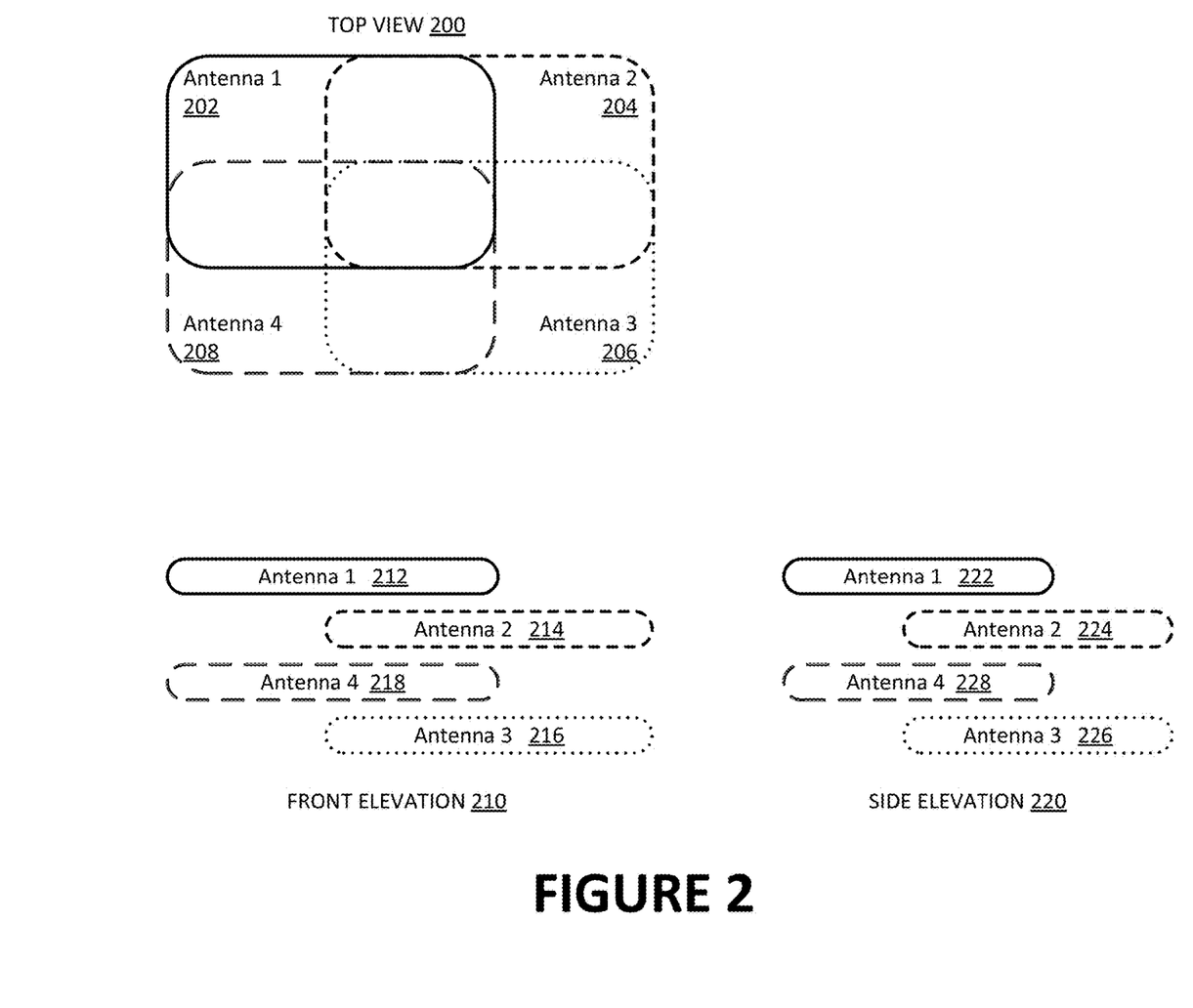
FIG. 2 illustrates schematics of an embodiment of a 3-dimensional (3D) NFC antenna.

FIG. 2 illustrates schematics of an embodiment of a 3-dimensional (3D) NFC antenna. As shown in top view 200, the 3D antenna includes antenna 1 202, antenna 2 204, antenna 3 206, and antenna 4 208. The four antennae are offset from each other as shown. FIG. 2 also shows front elevation 210, which shows frontal views of the four antennae stacked in offset layers as antenna 1 212, antenna 2 214, antenna 3 216, and antenna 4 208. FIG. 2 also shows side elevation 220, which shows side views of the four antennae stacked in offset layers as antenna 1 222, antenna 2 224, antenna 3 226, and antenna 4 228.

Figure 3:
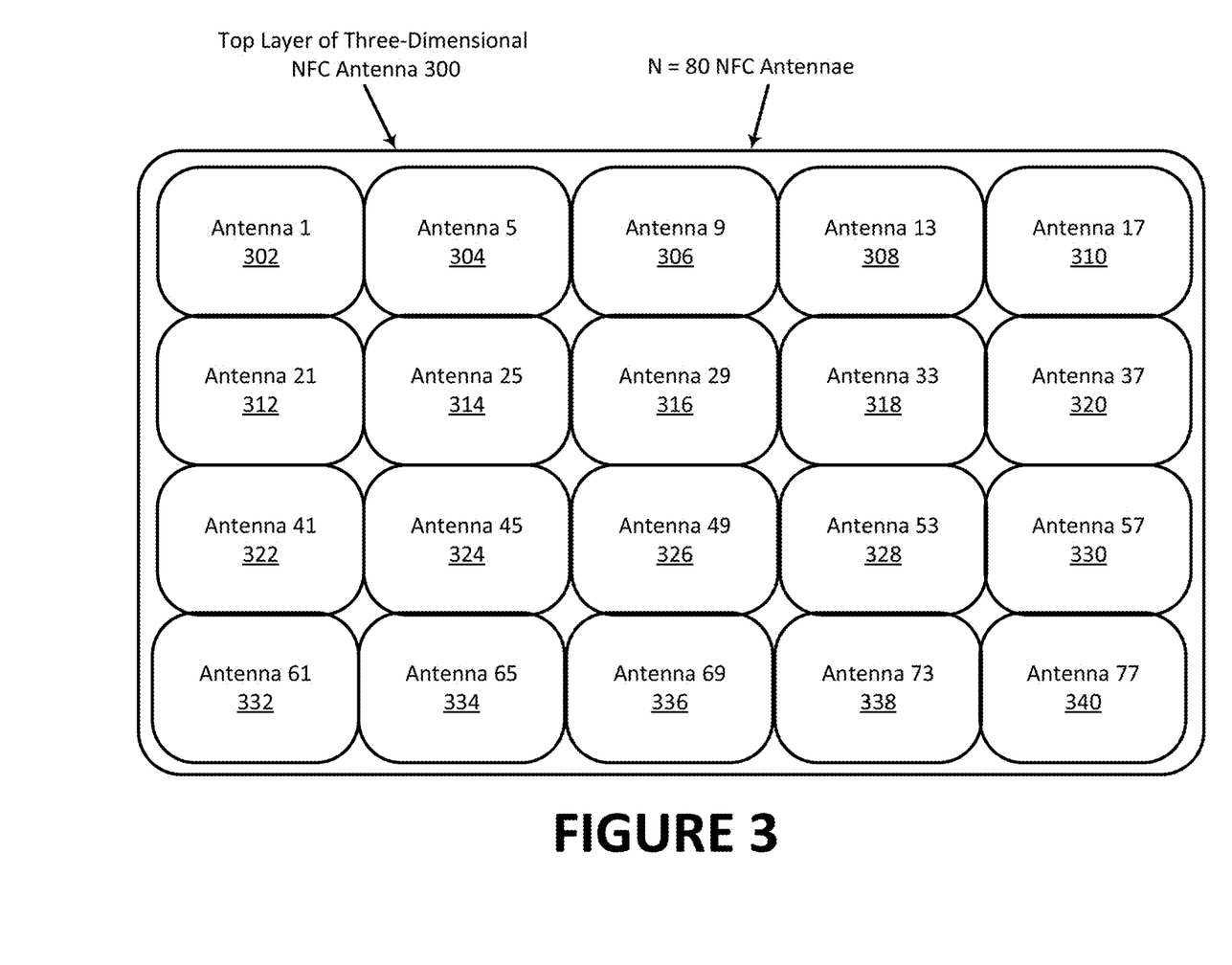
FIG. 3 illustrates a top view of a top layer of a 3D NFC antenna.

FIG. 3 illustrates a top layer of an embodiment of a 3D NFC antenna. Here, the top layer of three-dimensional antenna 300 includes 20 antennae: antenna 1 302, antenna 5 304, antenna 9 306, antenna 13 308, antenna 17 310, antenna 21 312, antenna 25 314, antenna 29 316, antenna 33 318, antenna 37 320, antenna 41 322, antenna 45 324, antenna 49 326, antenna 53 328, antenna 57 330 antenna 61 332, antenna 65 334, antenna 69 336, antenna 73 338, and antenna 77 340. Not shown are the three equally sized NFC antenna layers underneath the top layer.

Figure 4:
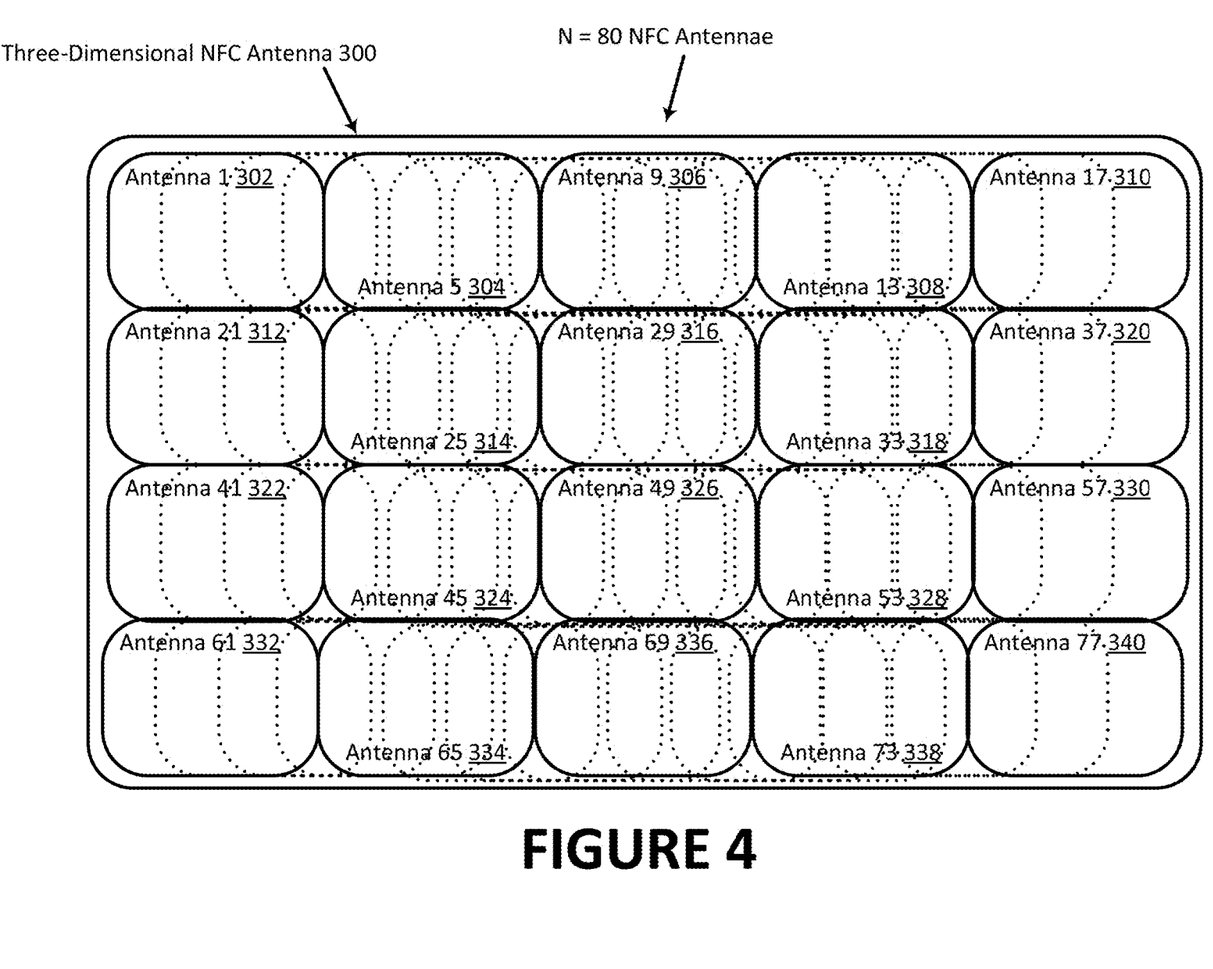
FIG. 4 depicts another top view of a top layer of a 3D NFC antenna.
Figure 5:
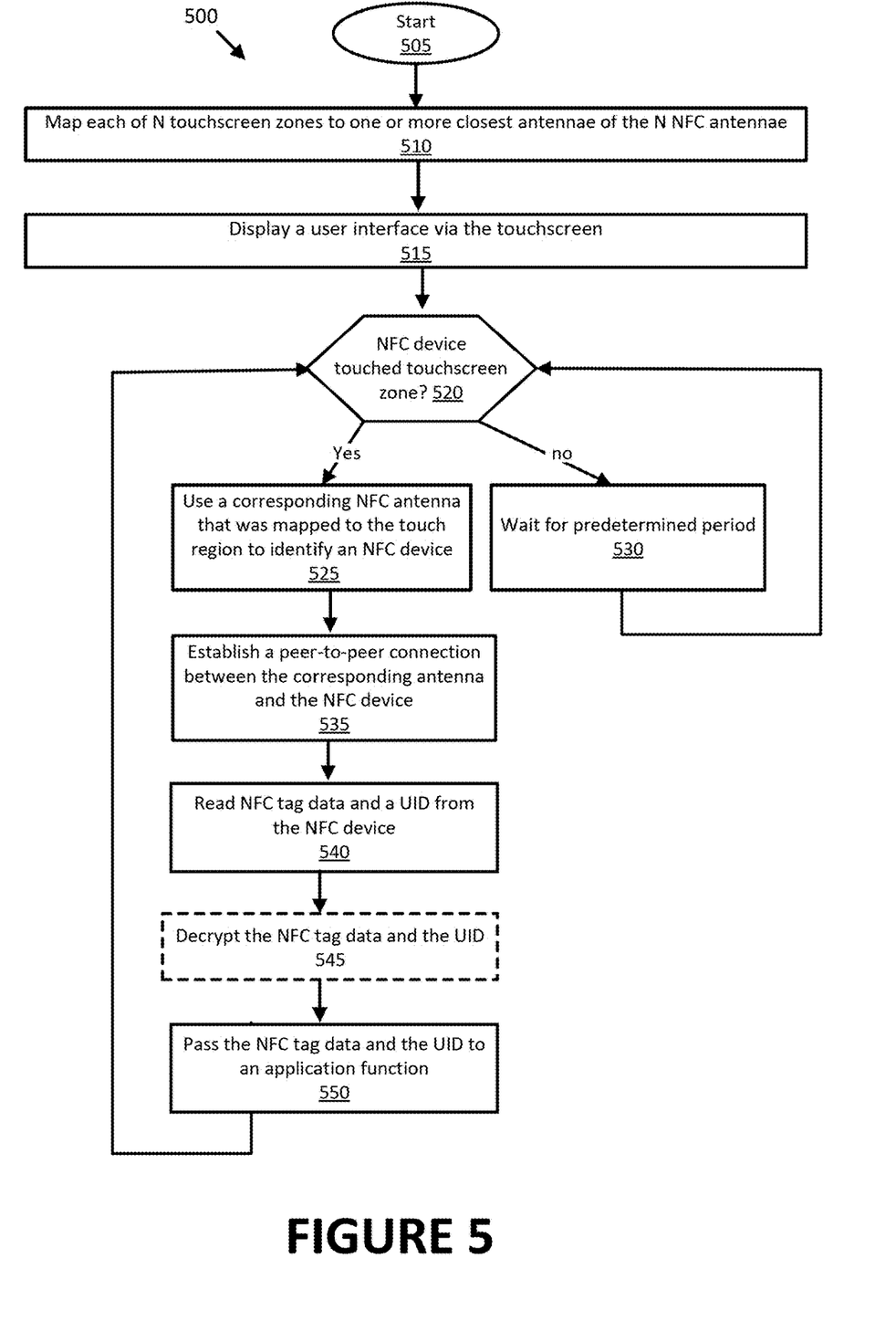
FIG. 5 is an illustrative flow of executing an application using multiple NFC tags.

FIG. 4 depicts another view of an embodiment of a 3D NFC antenna. Here, the top layer of three-dimensional antenna 300 is again shown and includes 20 antennae: antenna 1 302, antenna 5 304, antenna 9 306, antenna 13 308, antenna 17 310, antenna 21 312, antenna 25 314, antenna 29 316, antenna 33 318, antenna 37 320, antenna 41 322, antenna 45 324, antenna 49 326, antenna 53 328, antenna 57 330 antenna 61 332, antenna 65 334, antenna 69 336, antenna 73 338, and antenna 77 340. Here, the three layers under the top layer are shown as dotted lines, indicating their offset position under the top layer.

FIG. 5 is an illustrative flow of executing an application with multiple NFC tags. As shown, a processor is to perform flow 500 to execute an application using information stored on up to N near-field communication (NFC) devices, the processor being disposed in a system comprising a touchscreen having a top layer logically partitioned into N zones, and a three-dimensional (3D) antenna disposed beneath the touchscreen and comprising a plurality of NFC antenna layers with the layers together comprising N NFC antennae. For example. a processor inside computing device 100 is to execute flow 500, starting at 505. At 510, the processor is to map each of the N touchscreen zones to one or more closest antennae of the N NFC antennae. At 515, the processor is to display a user interface via the touchscreen. At 520, the processor is to check whether an NFC device touched a touchscreen zone. If not, at 530, the processor is to wait for a predetermined period before returning to 520 to check again. But, if so, at 525, the processor is to use a corresponding NFC antenna that was mapped to the touch region to identify an NFC device. Then, at 535, the processor is to establish a peer-to-peer connection between the corresponding antenna and the NFC device. At 540, the processor is to read NFC tag data and a UID from the NFC device. In some embodiments, at 545, the processor is to decrypt the NFC tag data and the UID. Operation 545 is indicated with a dashed border to indicate that it is optional insofar as the NFC tag data and the UID might not have been encrypted. At 550 the processor is to pass the NFC tag data and the UID to an application function. The flow then returns to 520 to await the next NFC device touch.

FIG. 6 depicts a protocol stack of near-field communications (NFC) standards. As shown, NFC operations and modes that are applied by NFC devices and NFC antennae herein comply at the top level with ECMA 352, and ISO/IEC 21481, promulgated by ECMA International and the International Organization for Standardization/International Electrotechnical Commission, respectively.

Figure 7:
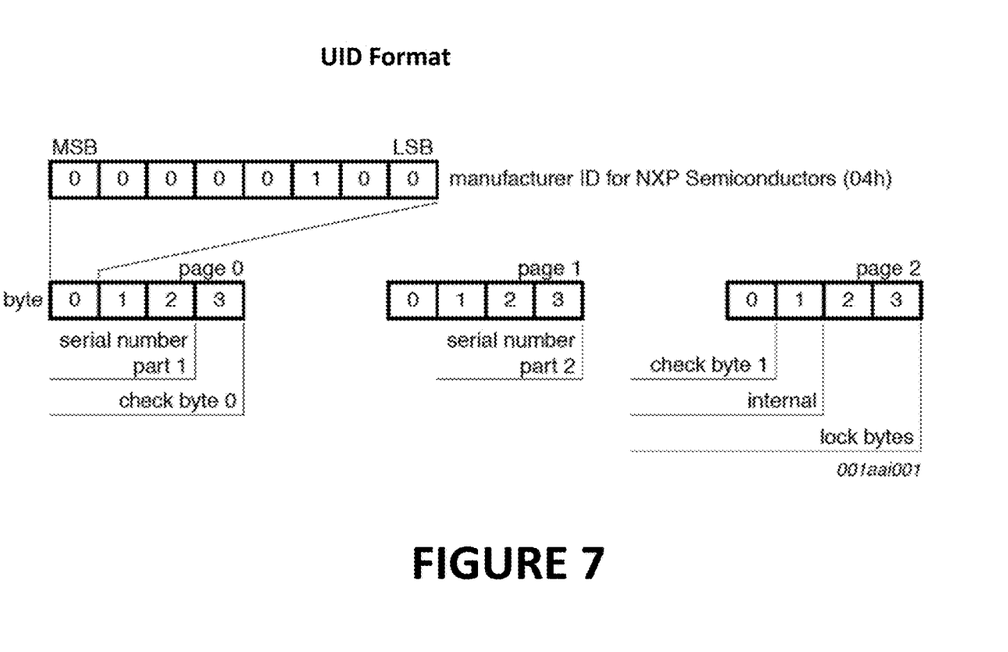
FIG. 7 illustrates an example format of an NFC unique identifier (UID).

FIG. 7 illustrates an example format of an NFC unique identifier (UID). The UID is a unique, 7-byte value, that is contained in every NFC device. The processor inside computing device 100 reads the UID of each NFC device that touched the touchscreen at operation 540 of the flow illustrated in FIG. 5. At operation 550, that UID is passed to an application function. Though not shown in FIG. 5, the application function is to use the UID to determine the manufacturer and serial number of the NFC device, and the corresponding functions made available by the NFC device. The application function is expected to locate the manufacturer ID and serial number in a publicly available list of NFC devices. If the application function fails to find the NFC device in a publicly available list, it may query a user of the computing device 100 to retrieve that info. Such a query is beyond the scope of this disclosure.

FIG. 8 illustrates a virtual checkout stand device using multiple NFC payment devices. As shown, computing device 800 is similar to computing device 100, but is intended for use in a financial transaction processing application. For example, computing device 800 simultaneously uses multiple NFC devices to securely process a payment for goods or services. As shown, computing device 800 includes an infrared touchscreen over a 3D NFC antenna 802. NFC-enabled debit card 804, NFC-enabled credit card 806, and NFC-enabled gift card 808 simultaneously connect with computing device 800. To the extent computing device 800 is used to connect with one or more payment cards in the context of payment processing, it is sometimes referred to herein as a virtual cash register or virtual checkout stand.

FIG. 9 illustrates a virtual security device using multiple NFC security devices. As shown, computing device 900 is similar to computing device 100, but is intended for use in a security application. For example, computing device 900 simultaneously uses multiple NFC devices to perform multifactor authentication. As shown, computing device 900 includes an infrared touchscreen over a 3D NFC antenna 902. RFID security card 904, an NFC-enabled lock 906, and an NFC-enabled identity badge 908 simultaneously connect with computing device 900. To the extent computing device 900 is used for a security application, it is sometimes referred to herein as a virtual security device.

Figure 10:
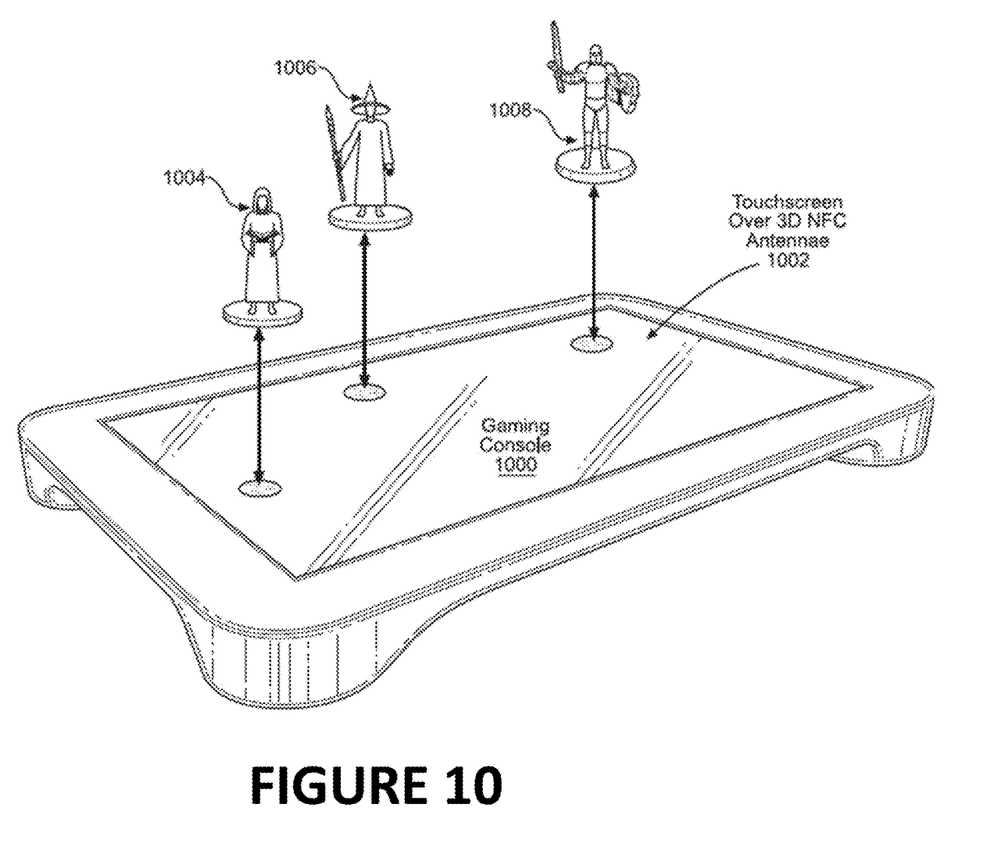
FIG. 10 illustrates a virtual gaming device using multiple NFC game pieces.

FIG. 10 illustrates a computing device and multiple NFC game pieces. As shown, computing device 1000 is similar to computing device 100, but is intended for use in a gaming context, for example, Dungeons & Dragons. Here, computing device 1000 simultaneously uses multiple NFC devices as game pieces. As shown, computing device 1000 includes an infrared touchscreen over a 3D NFC antenna 1002. Figurines representing D&D characters 1004, 1006, and 1008, simultaneously connect with computing device 1000. To the extent computing device 1000 is used in a gaming context it is sometimes referred to herein as a virtual gaming device or virtual game console.

Figure 11:
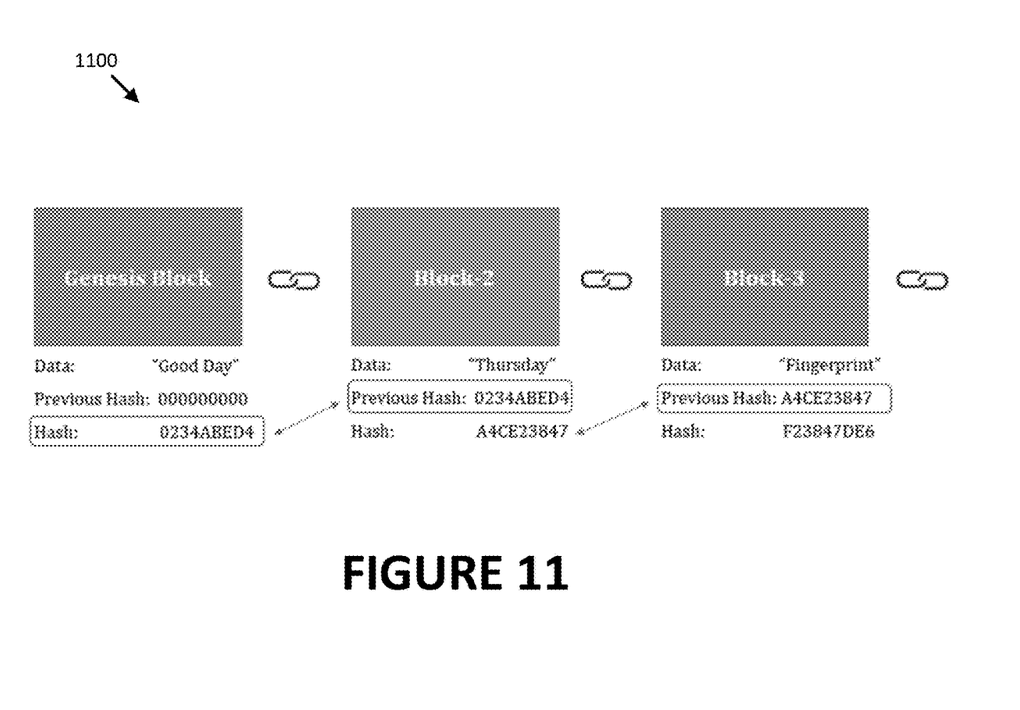
FIG. 11 illustrates a Blockchain, according to some embodiments.

FIG. 11 illustrates a Blockchain, according to some embodiments. As shown, blockchain 1100 includes a chain of 3 blocks. Each block contains data, a previous hash, and a hash. The first block in the chain has a previous hash set to 00000000 and is referred to as the Genesis block. Blocks 2 and 3 are chained to the Genesis block. In operation, known Blockchain technology can be used to securely store a chain of collectible game pieces.

FURTHER EXAMPLES

The following examples describe various examples of configurations, methods, and embodiments of the disclosed invention, as described above.

Example 1 provides an exemplary system including: a processor to execute an application using information stored on up to N near-field communication (NFC) devices, a touchscreen including a top layer logically partitioned into N zones, a three-dimensional (3D) antenna disposed beneath the touchscreen and including a plurality of stacked layers together including at least N NFC antennae, and wherein the processor is configured to: map each of the N zones to one or more closest NFC antennae, display a user interface on the top layer, and when each of two or more NFC devices touches a respective touchscreen zone, select an NFC antenna to establish a peer-to-peer connection with the NFC device, read NFC tag data from the NFC device, and pass the NFC tag data to the application.

Example 2 includes the substance of the exemplary system of Example 1, wherein the NFC antenna selected to connect with each of the two or more NFC devices (NFC tags) is one of the one or more closest NFC antennae mapped to the respective zone, is not already paired with another NFC device, and, when compared to other NFC antennae of the one or more NFC antennae, exhibits the highest quality reading of the NFC device.

Example 3 includes the substance of the exemplary system of Example 1, wherein the processor is further configured to cause each of the two or more NFC devices to establish an NFC wireless charging mode, an NFC card emulation mode, and an NFC reader/writer mode with the NFC antenna.

Example 4 includes the substance of the exemplary system of Example 1, wherein the touchscreen is an infrared (IR) touchscreen, which provides better durability than a comparably-sized capacitive touchscreen because it does not require patterned glass, and better sensitivity that a comparably-sized resistive touchscreen because it does not require as much force in a touch.

Example 5 includes the substance of the exemplary system of Example 1, wherein the application is a multi-factor authentication application, and the one or more NFC devices include multiple identifying items.

Example 6 includes the substance of the exemplary system of Example 1, wherein the processor is further configured to cause write data to be written to the NFC device from the NFC antenna, the write data including any of log data to log a use of the NFC device, ownership information to customize the NFC device, and Blockchain data to add the NFC device to a Blockchain.

Example 7 includes the substance of the exemplary system of Example 1, wherein the application is a gaming application, the one or more NFC devices are game pieces, and the processor is further configured to, for each NFC device, retrieve a unique identifier (UID) including a manufacturer and a serial number, determine available application functions to be performed based on the UID, selects a function to perform, and perform the function.

Example 8 includes the substance of the exemplary system of Example 7, wherein the up to An NFC devices include a set of game pieces sufficient to execute a multiplayer game from start to finish.

Example 9 includes the substance of the exemplary system of Example 8, wherein the gaming application is a fantasy sports game, and the set of game pieces is sufficient to fill every roster spot.

Example 10 includes the substance of the exemplary system of Example 7, wherein the game pieces include valuable, collectible items, and are organized into a Blockchain, serving as a ledger to maintain the game pieces as digital assets.

Example 11 provides an exemplary method of executing an application simultaneously using information stored on up to N near-field communication (NFC) devices by a computing device including a processor, a touchscreen including a top layer logically partitioned into N zones, and a three-dimensional (3D) antenna disposed beneath the touchscreen and including a plurality antenna layers together including at least N NFC antennae, the method including:

mapping each of the N zones to one or more closest NFC antennae, displaying a user interface on the top layer, and when each of two or more NFC devices touches a respective touchscreen zone, selecting an NFC antenna to establish a peer-to-peer connection with the NFC device, reading NFC tag data from the NFC device, and passing the NFC tag data to the application.

Example 12 includes the substance of the exemplary method of Example 11, wherein the NFC antenna selected to connect with each of the two or more NFC devices is one of the one or more closest NFC antennae mapped to the respective zone, is not already paired with another NFC device, and, when compared to other NFC antennae of the one or more NFC antennae, exhibits the highest quality reading of the NFC device.

Example 13 includes the substance of the exemplary method of Example 11, further including causing each of the two or more NFC devices to establish an NFC wireless charging mode, an NFC card emulation mode, and an NFC reader/writer mode with the NFC antenna.

Example 14 includes the substance of the exemplary method of Example 11, wherein the touchscreen is an infrared (IR) touchscreen, which provides better durability than a comparably-sized capacitive touchscreen because it does not require patterned glass, and better sensitivity that a comparably-sized resistive touchscreen because it does not require as much force in a touch.

Example 15 includes the substance of the exemplary method of Example 11, wherein the application is a multi-factor authentication application, and the one or more NFC devices include multiple identifying items.

Example 16 includes the substance of the exemplary method of Example 11, wherein the processor is further configured to cause write data to be written to the NFC device from the NFC antenna, the write data including any of log data to log a use of the NFC device, ownership information to customize the NFC device, and Blockchain data to add the NFC device to a Blockchain.

Example 17 includes the substance of the exemplary method of Example 11, wherein the application is a gaming application, the one or more NFC devices are game pieces, and the processor is further configured to, for each NFC device, retrieve a unique identifier (UID) including a manufacturer and a serial number, determine available application functions to be performed based on the UID, selects a function to perform, and perform the function.

Example 18 includes the substance of the exemplary method of Example 17, wherein the NFC devices include a set of game pieces sufficient to execute a multiplayer game from start to finish.

Example 19 includes the substance of the exemplary method of Example 18, wherein the gaming application is a fantasy sports game, and the set of game pieces is sufficient to fill every roster spot.

Example 20 includes the substance of the exemplary method of Example 17, wherein the game pieces include valuable, collectible items, and are organized into a Blockchain, serving as a ledger to maintain the game pieces as digital assets.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A system comprising:
a processor to execute an application using information stored on up to N near-field communication (NFC) devices;
a touchscreen comprising a top layer logically partitioned into one or more zones;
a three-dimensional (3D) antenna disposed beneath the touchscreen and comprising a plurality of stacked layers together comprising two or more NFC antennae; and
wherein the processor is configured to:
map each respective touchscreen zone to one or more closest NFC antennae;
display a user interface during a current execution of the application via the touchscreen; and
when each of two or more NFC devices are simultaneously touching a respective different touchscreen zone during display of the user interface via the touchscreen, the processor is further configured to:
establish a peer-to-peer connection between each respective NFC device and a corresponding different NFC antenna mapped to the different touchscreen zone that the respective NFC device touches;
read NFC tag data from each respective NFC device;
pass the NFC tag data to the application; and
present, via the user interface displayed on the touchscreen, information relative to each of the two or more respective touching NFC devices generated by the current execution of the application.

2. The system of claim 1, wherein the NFC antenna selected to connect with each of the two or more NFC devices (NFC tags) is one of the one or more closest NFC antennae mapped to the respective zone, is not already paired with another NFC device, and, when compared to other NFC antennae of the one or more NFC antennae, exhibits the highest quality reading of the NFC device.

3. The system of claim 1, wherein the processor is further configured to cause each of the two or more NFC devices to establish an NFC wireless charging mode, an NFC card emulation mode, and an NFC reader/writer mode with the NFC antenna.

4. The system of claim 1, wherein the touchscreen is an infrared (IR) touchscreen, which (i) provides a greater measure of durability than a comparably-sized capacitive touchscreen that includes a glass comprising a pattern, and (ii) requires less of a measure of force from a touch than the comparably-sized capacitive touchscreen, wherein the IR touchscreen and the comparably-sized capacitive touchscreen differ with respect to a presence of the glass comprising a pattern.

5. The system of claim 1, wherein the application is a multi-factor authentication application, and the one or more NFC devices comprise multiple identifying items.

6. The system of claim 1, wherein the processor is further configured to cause write data to be written to the NFC device from the NFC antenna, the write data comprising any of log data to log a use of the NFC device, ownership information to customize the NFC device, and Blockchain data to add the NFC device to a Blockchain.

7. The system of claim 1, wherein the application is a gaming application, the one or more NFC devices are game pieces, and the processor is further configured to, for each NFC device, retrieve a unique identifier (UID) including a manufacturer and a serial number, determine available application functions to be performed based on the UID, selects a function to perform, and perform the function.

8. The system of claim 7, wherein the one or more NFC devices comprise a set of game pieces sufficient to execute a multiplayer game from start to finish.

9. The system of claim 8, wherein the gaming application is a fantasy sports game, and the set of game pieces is sufficient to fill every roster spot.

10. The system of claim 7, wherein the game pieces comprise valuable, collectible items, and are organized into a Blockchain, serving as a ledger to maintain the game pieces as digital assets.

11. A method of executing an application simultaneously using information stored on up to one or more near-field communication (NFC) devices by a computing device comprising a processor, a touchscreen comprising a top layer logically partitioned into one or more zones, and a three-dimensional (3D) antenna disposed beneath the touchscreen and comprising a plurality antenna layers together comprising two or more NFC antennae, the method comprising:
mapping each respective touchscreen zone to one or more closest NFC antennae;
displaying a user interface during a current execution of the application via the touchscreen; and
when each of two or more NFC devices are simultaneously touching a respective different touchscreen zone during display of the user interface via the touchscreen:
establishing a peer-to-peer connection between each respective NFC device and a corresponding different NFC antenna mapped to the different touchscreen zone that the respective NFC device touches;

reading NFC tag data from each respective NFC device;

passing the NFC tag data to the application; and presenting, via the user interface displayed on the touchscreen, information relative to each of the two or more respective touching NFC devices generated by the current execution of the application.

12. The method of claim 11, wherein the NFC antenna selected to connect with each of the two or more NFC devices is one of the one or more closest NFC antennae mapped to the respective zone, is not already paired with another NFC device, and, when compared to other NFC antennae of the one or more NFC antennae, exhibits the highest quality reading of the NFC device.

13. The method of claim 11, further comprising causing each of the two or more NFC devices to establish an NFC wireless charging mode, an NFC card emulation mode, and an NFC reader/writer mode with the NFC antenna.

14. The method of claim 11, wherein the touchscreen is an infrared (IR) touchscreen, which (i) provides a greater measure of durability than a comparably-sized capacitive touchscreen that includes a glass comprising a pattern, and (ii) requires less of a measure of force from a touch than the comparably-sized capacitive touchscreen, wherein the IR touchscreen and the comparably-sized capacitive touchscreen differ with respect to a presence of the glass comprising a pattern.

15. The method of claim 11, wherein the application is a multi-factor authentication application, and the one or more NFC devices comprise multiple identifying items.

16. The method of claim 11, wherein the processor is further configured to cause write data to be written to the NFC device from the NFC antenna, the write data comprising any of log data to log a use of the NFC device, ownership information to customize the NFC device, and Blockchain data to add the NFC device to a Blockchain.

17. The method of claim 11, wherein the application is a gaming application, the one or more NFC devices are game pieces, and the processor is further configured to, for each NFC device, retrieve a unique identifier (UID) including a manufacturer and a serial number, determine available application functions to be performed based on the UID, selects a function to perform, and perform the function.

18. The method of claim 17, wherein the one or more NFC devices comprise a set of game pieces sufficient to execute a multiplayer game from start to finish.

19. The method of claim 18, wherein the gaming application is a fantasy sports game, and the set of game pieces is sufficient to fill every roster spot.

20. The method of claim 17, wherein the game pieces comprise valuable, collectible items, and are organized into a Blockchain, serving as a ledger to maintain the game pieces as digital assets.

21. The system of claim 1, wherein each of the two or more NFC devices are physically separate from each other and the touchscreen prior to simultaneously touch the respective different touchscreen zones.

22. The system of claim 1, wherein read and pass the NFC tag data comprises:

read and pass the NFC tag data from each individual NFC device currently touching a distinct touchscreen zone via one or more particular NFC antennas with which the individual NFC device has the peer-to-peer connection, the peer-to-peer connection established due a mapping between the one or more particular NFC antennas and the distinct touchscreen zone currently touched by the individual NFC device.

* * * * *